United States Patent
Bizzarri et al.

(10) Patent No.: US 10,979,915 B2
(45) Date of Patent: Apr. 13, 2021

(54) METHOD AND SYSTEM FOR MANAGING TELECOMMUNICATION NETWORK APPARATUSES

(71) Applicant: TELECOM ITALIA S.p.A., Milan (IT)

(72) Inventors: Simone Bizzarri, Turin (IT); Andrea Buldorini, Turin (IT); Giorgio Calochira, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/483,664

(22) PCT Filed: Feb. 2, 2018

(86) PCT No.: PCT/EP2018/052651
§ 371 (c)(1),
(2) Date: Aug. 5, 2019

(87) PCT Pub. No.: WO2018/149664
PCT Pub. Date: Aug. 23, 2018

(65) Prior Publication Data
US 2020/0022003 A1    Jan. 16, 2020

(30) Foreign Application Priority Data
Feb. 15, 2017    (IT) .................. 102017000016599

(51) Int. Cl.
*H04M 3/00* (2006.01)
*H04B 15/00* (2006.01)
(Continued)

(52) U.S. Cl.
CPC .......... *H04W 24/02* (2013.01); *H04L 41/0853* (2013.01); *H04L 41/145* (2013.01); *H04W 16/22* (2013.01); *H04W 24/08* (2013.01)

(58) Field of Classification Search
CPC ..... H04W 24/02; H04W 24/08; H04W 16/22; H04L 41/145; H04L 41/0853
(Continued)

(56) References Cited

U.S. PATENT DOCUMENTS

| | | | |
|---|---|---|---|
| 5,436,909 A | 7/1995 | Dev et al. | |
| 5,504,921 A | 4/1996 | Dev et al. | |

(Continued)

FOREIGN PATENT DOCUMENTS

| | | |
|---|---|---|
| EP | 1 480 377 A1 | 11/2004 |
| WO | WO 92/05485 A2 | 4/1992 |
| WO | WO 2010/101529 A1 | 9/2010 |

OTHER PUBLICATIONS

International Search Report and Written Opinion dated Apr. 24, 2018 in PCT/EP2018/052651 filed Feb. 2, 2018.
(Continued)

*Primary Examiner* — Mark G. Pannell
(74) *Attorney, Agent, or Firm* — Oblon, McClelland, Maier & Neustadt, L.L.P.

(57) ABSTRACT

A method of managing a network apparatus of a telecommunication network, where the network apparatus does not expose management interfaces sufficient to allow managing at least one operational parameter thereof of interest for the managing, includes collecting data about the network apparatus to be managed by making requests to the network apparatus to be managed and to at least one other network apparatus in operating relationships with the network apparatus to be managed. Based on the collected data, generating a behavioral model of the network apparatus to be managed.

(Continued)

The behavioral model is an inferred logical and mathematical model of the behavior of the network apparatus to be managed with respect to the operational parameter thereof of interest for the managing. The method also includes and managing the network apparatus to be managed exploiting the generated behavioral model thereof.

12 Claims, 6 Drawing Sheets

(51) Int. Cl.

| | | |
|---|---|---|
| *G06F 15/177* | (2006.01) | |
| *H04W 24/02* | (2009.01) | |
| *H04L 12/24* | (2006.01) | |
| *H04W 16/22* | (2009.01) | |
| *H04W 24/08* | (2009.01) | |

(58) Field of Classification Search
USPC .......................................................... 455/418
See application file for complete search history.

(56) References Cited

U.S. PATENT DOCUMENTS

| | | | |
|---|---|---|---|
| 5,742,587 A * | 4/1998 | Zornig | H04L 12/44 370/235 |
| 5,812,750 A | 9/1998 | Dev et al. | |
| 6,049,828 A | 4/2000 | Dev et al. | |
| 6,374,293 B1 | 4/2002 | Dev et al. | |
| H2059 H * | 2/2003 | Ledsham | 455/466 |
| H2072 H * | 7/2003 | Ledsham | 455/466 |
| 7,664,846 B2 * | 2/2010 | Tiruthani | H04L 29/06027 709/224 |
| 2002/0032769 A1 * | 3/2002 | Barkai | G06Q 10/087 709/224 |
| 2002/0082004 A1 * | 6/2002 | Sakai | H04W 16/18 455/423 |
| 2005/0021709 A1 | 1/2005 | Canali et al. | |
| 2006/0092861 A1 * | 5/2006 | Corday | H04L 41/5009 370/256 |
| 2011/0035202 A1 * | 2/2011 | Quinn | H04L 41/0631 703/13 |
| 2011/0207461 A1 * | 8/2011 | Lundqvist | H04W 24/02 455/436 |
| 2011/0225289 A1 * | 9/2011 | Prasad | G06Q 30/02 709/224 |
| 2011/0305293 A1 * | 12/2011 | Choi | H04W 72/082 375/285 |
| 2012/0094650 A1 | 4/2012 | Lei et al. | |
| 2013/0005297 A1 * | 1/2013 | Sanders | H04W 4/029 455/406 |
| 2014/0136685 A1 * | 5/2014 | Chan | H04L 41/142 709/224 |
| 2014/0317248 A1 * | 10/2014 | Holness | H04L 41/0816 709/221 |
| 2015/0128156 A1 * | 5/2015 | Zhu | G06F 11/3072 719/328 |
| 2018/0152452 A1 * | 5/2018 | Hu | H04L 67/28 |
| 2019/0260838 A1 * | 8/2019 | Berarducci | G06F 3/1222 |

OTHER PUBLICATIONS

Zhou, J. et al., "Error analysis of non-collaborative wireless localization in circular-shaped regions," Computer Networks, vol. 54, No. 14, Oct. 6, 2010, pp. 2439-2452, XP027247861.

* cited by examiner

METHOD AND SYSTEM FOR MANAGING TELECOMMUNICATION NETWORK APPARATUSES

BACKGROUND

Technical Field

The solution disclosed in this document generally relates to telecommunication networks, such as mobile radio communication networks, like cellular networks.

More specifically, the solution disclosed in this document concerns a method and a system for managing apparatuses of a telecommunication network.

Overview of the Related Art

Nowadays, a significant obstacle to the management of telecommunication networks by their operators resides in that the networks use proprietary network apparatuses, developed and commercialized by a few manufacturers. For the purposes of the present description, the expression "network apparatus" is to be intended to cover not only physical network apparatuses (comprised of hardware and software), such as telecommunication network nodes (e.g., an eNodeB of an LTE/LTE-A, 5G cellular network), but, more generally, any telecommunication network functionality, including software-implemented tools).

Such network apparatuses, despite having to comply with the existing standards in the field of the telecommunications (like the standards developed by the $3^{rd}$ Generation Partnership Project—3GPP—for 2G, 3G, 4G, 5G networks), implement proprietary functionalities and expose proprietary management interfaces, both of which are under the discretion of the manufacturers. Thus, the operators of the telecommunication networks need to purchase and use proprietary management systems/tools, made available by the network apparatuses manufacturers. This increases the burden on the operators of the telecommunication networks, in terms of complexity and costs of the telecommunication network management system.

Generally, the management policies of the network apparatuses of a telecommunication network depend on a number of factors, such as:

the functionalities of the network apparatuses: for example, in a telecommunication network there are several types of network nodes, and each network node type comprises network nodes that perform a specific function in the network architecture (e.g.: access network nodes, core network nodes, transport network nodes); the specific function of a network node determines its general functionality, the interfaces it exposes to other network nodes, and thus the specific management aspects of that network node;

the available management interfaces of the network apparatuses: every network apparatus exposes some interfaces towards the apparatuses/functionalities of the telecommunication network management system, and such exposed interfaces, despite having in some respects to comply with the existing standards, are proprietary of the network apparatuses manufacturers;

the policies of update of the software of the network apparatuses.

This situation causes several problems from the point view of the management to be operated by the telecommunication network operator, such as:

high management costs: the telecommunication network management system needs to be constantly updated, to fit the requirements of the apparatuses purchased from the network apparatuses manufacturers (usually, during time, the exposed interfaces change and the management tools evolve);

inefficient management policies: the heterogeneity of the network apparatuses and of the interfaces they expose makes it necessary to develop different management systems and procedures depending on the kind of network apparatus, e.g. network node to be managed; dependence of the network management on the network management tools.

In Hadjiantonis, A. M., Malatras, A., Pavlou, G. "A context-aware, policy-based framework for the management of MANETs", Proceedings of the Seventh IEEE International Workshop on Policies for Distributed Systems and Networks (POLICY'06) 0-7695-2598-9/06, a hybrid approach is proposed, employing a hierarchical and distributed organizational model for MANET (Mobile Ad-hoc NETwork) management. A policy-based network management (PBNM) approach is adopted, together with context awareness, and a system architecture is presented that is capable of effectively managing a MANET.

In Longo, L., Barrett, S. "A context-aware approach based on self-organizing maps to study web-users' tendencies from their behaviour", Proceedings of the $1^{st}$ International Workshop on ContextAware Middleware and Services affiliated with the 4th International Conference on Communication System Software and Middleware COMSWARE 2009 CAMS 09, ACM Press, pp. 12-17, an approach to web content is presented, based on Kohonen mapping, used to generate a topological model of users' behaviour over web-pages. Each web-document can thus be represented as a semantic map built by adopting unsupervised techniques where similar users' behaviour are mapped close together, with identification of information stability emerging as a by-product of the identification of similarity in user activity over content. In the proposed model, the more similar the outputs of the map for each user who has endorsed a web-page, the more the web site is considered current or in context with changing information.

In US 2014/0317041 a method and a system are disclosed for providing a context awareness based networking operation in smart ubiquitous networks. A network entity is provided with a networking operation that enables dynamically acquiring context information from various sources (for example, an end user, an end user device, a network, a service, and a content) in smart ubiquitous networks, processing, that is, analysing and deducing related information in the acquired context information, and thereafter, controlling and managing the network depending on the recognized context.

SUMMARY OF THE DISCLOSED SOLUTION

In general terms, the Applicant has tackled the problem of overcoming, or at least attenuating, the problems outlined in the foregoing, so as to simplify the management of a telecommunication network by the network operator.

More particularly, the Applicant has found a solution which implements mechanisms which make the telecommunication network itself capable of understanding what is going on with its apparatuses and to consequently act to enforce management policies, without having to devise costly and inefficient heterogeneous network management systems.

The solution disclosed in this document is aimed at the management of a network apparatus, independently of how it is constructed and in a way that is independent of the specific context in which the network apparatus operates.

The Applicant has understood that the network apparatus management functions are primarily concerned with (but not limited to):
- the configuration of the network apparatus (configuration of parameters that, directly or indirectly, affect the behaviour of the network apparatus);
- the evaluation of the performance of the network apparatus;
- the detection of faults in the network apparatus and the management thereof (aimed at possibly solving the faults).

Based on this understanding, the Applicant has devised a solution which is able to accomplish the above-listed functions (as well as other functions) by adapting to the specific operating context of a target network apparatus (i.e., the network apparatus to be managed).

The Applicant has understood that the specific operating context of a target network apparatus is characterized by, inter alia:
- the availability of interfaces, exposed by the target network apparatus, which are useful for the management thereof, particularly for performing the above-listed functions of configuration, performance evaluation and fault detection and management;
- the availability of information sources which are useful for characterizing the operating environment in which the target network apparatus operates;
- the availability of information sources which are useful for characterizing the behaviour of the target network apparatus (i.e., the actions performed by the target network apparatus during its operating life).

The solution disclosed herein, depending on the (full or partial) availability of the above-mentioned interfaces and information sources, is able to build a behavioural model of the target network apparatus. Such behavioural model is structured so as to correlate pieces of information of different kinds about the target network apparatus (information directly obtained from the target network apparatus, information obtained through the interfaces it exposes, information indirectly inferred from the available information sources). Particularly, the network apparatus behavioural model correlates the following three types of information about the target network apparatus:
- information relating to the behaviour of the target network apparatus (e.g., actions of acceptance/deny of new resource requests coming from another network apparatus);
- information relating to variables which are significant for inferring the internal state of the target network apparatus (e.g., the level of use of the resources available to the target network apparatus);
- information relating to the environment in which the target network apparatus operates (e.g., the frequency of requests of resources that other network functions send to the target network apparatus).

In greater detail, the solution disclosed herein is directed to a network management method and system (management apparatus, management software, a mix of both) that operates/is configured to be able to perform the following actions:
- collecting information indicative of the internal state of the target network apparatus; for example, such internal state information may relate to: the load level of the target network apparatus, the number of active connections, the number of available resources, etc.;
- collecting information indicative of the behaviour of the target network apparatus, i.e. information about the actions, observable from outside the target network apparatus, which the latter performs during its normal operation. Information of this kind can be:
  - collected passively, by observing the behaviour of the target network apparatus (e.g. by means of suitable probes, which can for example be the user equipment of the users);
  - collected actively, i.e. by stimulation of actions by the management system;
- collecting information indicative of the operating context of the target network apparatus (e.g., information about the network traffic offered to the target network apparatus).

Based on the collected information, the management system:
- builds a behavioural model of the target network apparatus. The behavioural model is built by defining a mathematical, logical/functional model of the target network apparatus;
- manages the target network apparatus exploiting the generated behavioural model thereof. In particular, the management system can for example make management decisions for the target network apparatus and deploy them in two ways:
  - direct mode: by configuring the internal operating variables of the target network apparatus through the exposed interfaces thereof (if available);
  - indirect mode: by configuring other network apparatuses belonging to the same network subsystem as the target network apparatus and which expose interfaces that make them more easily accessible by the management system.

The management of the target network apparatus can be actuated by the network management system either automatically (SON—Self-Organizing Network) or manually (by intervention of a human operator).

According to an aspect of the solution disclosed in this document, there is proposed a method of managing a network apparatus of a telecommunication network, wherein the network apparatus does not expose management interfaces sufficient to allow managing at least one operational parameter thereof of interest for the managing.

The method comprises:
- collecting data about the network apparatus to be managed by making requests to the network apparatus to be managed and to at least one other network apparatus ($F^{nc}$, $F^c$) in operating relationships with the network apparatus to be managed;
- based on the collected data, generating a behavioral model of the network apparatus to be managed, the behavioral model being an inferred logical and mathematical model of the behavior of the network apparatus to be managed with respect to the operational parameter thereof of interest for the managing, and
- managing the network apparatus to be managed exploiting the generated behavioral model thereof.

Preferably, said collecting information comprises generating stimuli for the network apparatus to be managed and collecting data indicative of the observed reactions thereof to the generated stimuli.

Preferably, said collecting data indicative of the observed reactions comprises collecting data from user equipment of the telecommunication network.

Said at least one other network apparatus may include at least one network apparatus that exposes management interfaces configured to provide, upon interrogation, data relating to its own internal state and that, being in operating relationship with the network functionality to be managed, has got and can provide data useful to define an operating context of the network functionality to be managed.

For example, the collected data may comprise one or more among:

- data, obtained from said at least one other network apparatus and sufficient to generate the behavioral model of the target network apparatus to be managed, that the network apparatus to be managed provides to said at least one other network apparatus;
- data, obtained directly from the network apparatus to be managed, that are not sufficient to generate the behavioral model thereof;
- data, obtained from said at least one other network apparatus, that are not sufficient to generate the behavioral model thereof.

Said generating the behavioral model of the network apparatus to be managed may for example comprise classifying the collected data in data classes, said data classes comprising:

- a first class of data indicative of the context in which the network apparatus to be managed operates;
- a second class of data indicative of the internal state of the network apparatus to be managed;
- a third class of data indicative of actions performed by the network apparatus to be managed.

Said first class of data may for example include one among: a geographical location of the network apparatus to be managed, an indication of the type of the neighboring network apparatuses in the neighborhood of the network apparatus to be managed, an indication of frequency plan(s) of the neighboring network apparatuses.

Said second class of data may for example include one among: an indication of the load level of the network apparatus to be managed, an indication of the resources used by the network apparatus to be managed, an indication of the available resources of the network apparatus to be managed.

Said third class of data may for example include one among: an indication of acceptance or denial of new requests of resources; an indication of occupation of new resources depending on the load level; an indication of directions of hand-overs.

In embodiments of the method, said generating the behavioral model of the network apparatus to be managed may comprise classifying the collected data in categories of variables, said categories of variables comprising:

- observable status variables, including data related to the internal status of the network apparatus to be managed that can be directly observed or inferred;
- controllable variables, including data related to parameters that can be set in order to push the network apparatus to be managed to execute a function;
- behavior variables, including data related to functionalities that the network apparatus to be managed can execute.

Said behavioral model of the network apparatus to be managed may for example comprise a finite-state machine representative of the network apparatus to be managed.

According to another aspect of the solution disclosed in this document, there is proposed a system for managing a network apparatus ($F^{nc}{}_T$) of a telecommunication network, wherein the network apparatus to be managed does not expose management interfaces sufficient to allow managing at least one operational parameter thereof of interest for the managing.

The system comprises:

- a data collector configured for collecting data about the network apparatus to be managed by making requests to the network apparatus to be managed and to at least one other network apparatus in operating relationships with the network apparatus to be managed;
- a behavioral model builder configured for generating, based on the collected data, a behavioral model of the network apparatus to be managed, the behavioral model being an inferred logical and mathematical model of the behavior of the network apparatus to be managed with respect to the operational parameter thereof of interest for the managing, and
- a manager configured for managing the network apparatus to be managed exploiting the generated behavioral model thereof.

Preferably, said data collector is further configured for generating stimuli for the network apparatus to be managed and collecting data indicative of the observed reactions thereof to the generated stimuli.

Preferably, said behavioral model builder is configured for classifying the collected data in categories of variables, said categories of variables comprising:

- observable status variables, including data related to the internal status of the network apparatus to be managed that can be directly observed or inferred;
- controllable variables, including data related to parameters that can be set in order to push the network apparatus to be managed to execute a function;
- behavior variables, including data related to functionalities that the network apparatus to be managed can execute.

Preferably, said behavioral model builder is configured for generating a finite-state machine representative of the network apparatus to be managed.

BRIEF DESCRIPTION OF THE DRAWINGS

These and other features and advantages of the solution disclosed herein will be better understood by reading the following detailed description of exemplary embodiments thereof, provided merely by way of non-limitative examples. For its better intelligibility, the following description should be read making reference to the attached drawings, wherein.

DETAILED DESCRIPTION OF EXEMPLARY EMBODIMENT OF THE DISCLOSED SOLUTION

Figure 1:
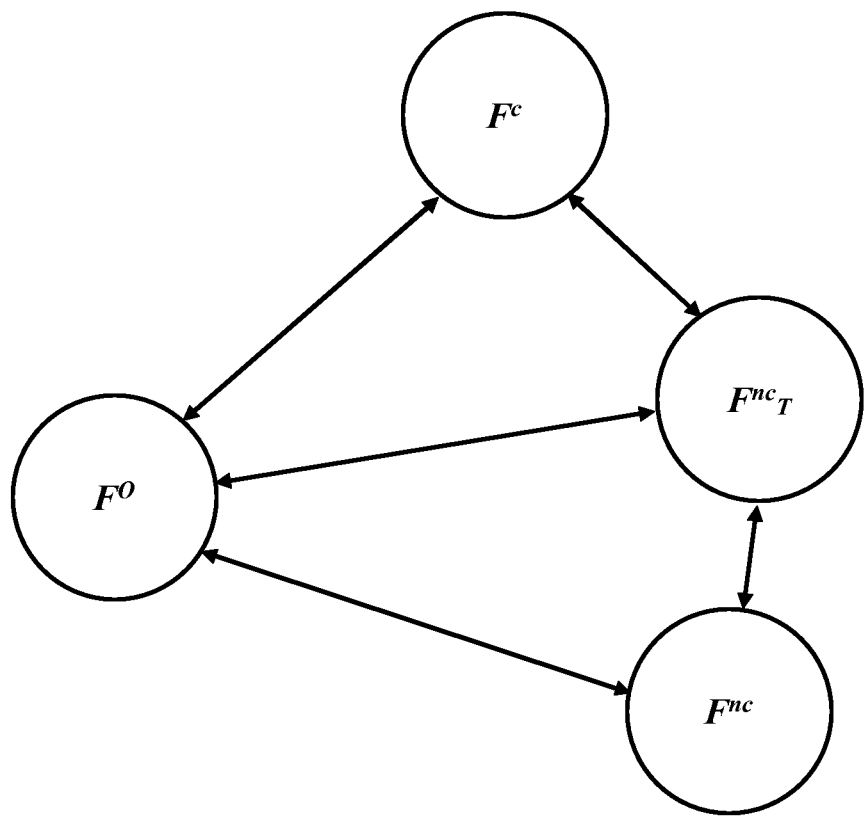
FIG. 1 schematically shows a simple scenario of a telecommunication network with a target network apparatus to be managed in accordance with the solution disclosed herein.

Making reference to FIG. 1, an exemplary, simplified scenario of a telecommunication network useful to understand the applicability of the solution disclosed herein is shown.

The circles in FIG. 1 schematically represent telecommunication network apparatuses, to be intended to cover not only physical network apparatuses, but more generally "network functionalities". A network functionality is an operating network entity that can be implemented as an ad-hoc system or as a suitably programmed general-purpose system, localized or virtualized/distributed. A "network functionality" can for example be a telecommunication network node, but it should be intended as encompassing also other network apparatuses, or parts of apparatuses, or combination of apparatuses.

Reference $F^{nc}_T$ ("Non-collaborative target functionality") denotes the network apparatus to be managed ("target"), and which is assumed not to provide to the exterior enough information regarding its internal state or its way of operating in response to its time-varying configuration parameters (for this reason, it is qualified as "non-collaborative"). For example, in case the Non-collaborative target functionality $F^{nc}_T$ is a mobile telecommunication network node (e.g., an eNodeB), it may happen that the Non-collaborative target functionality $F^{nc}_T$ does not provide information about its load level, and/or about the value of a load threshold thereof exploited by the Non-collaborative target functionality $F^{nc}_T$ for the Admission Control procedure (a validation process where a check is performed before a connection is established to see if current apparatus resources are sufficient for the proposed connection). The Non-collaborative target functionality $F^{nc}_T$ is the exemplary target of the operations of the solution herein disclosed.

Reference $F_O$ ("Observing functionality") denotes the network "management system" according to an embodiment of the solution disclosed herein, having the task of monitoring the Non-collaborative target functionality $F^{nc}_T$ in order to build a behavioural model of it and then to manage the Non-collaborative target functionality $F^{nc}_T$ by exploiting the generated behavioural model. To this purpose, the Observing functionality $F_O$:

- collects information and data useful for building the behavioural model of the Non-collaborative target functionality $F^{nc}_T$ (possibly also by actively stimulating the generation of the data, useful to generate the behavioural model, by the Non-collaborative target functionality $F^{nc}_T$ or by other network functionalities, as described shortly below);
- builds the behavioural model of the Non-collaborative target functionality $F^{nc}_T$, with the level of approximation allowed by the acquired data for the behaviour of interest;

takes the necessary actions for managing the Non-collaborative target functionality $F^{nc}_T$, using the generated behavioural model.

Reference $F^c$ ("Collaborative functionality") denotes a network apparatus that can provide (e.g., to the Observing functionality $F_O$) information about its own internal state and that, by interacting with the Non-collaborative target functionality $F^{nc}_T$, has got and can provide (this is why it is qualified as "collaborative") direct or indirect information useful (to the Observing functionality $F_O$) to define the operating context of the Non-collaborative target functionality $F^{nc}_T$.

Reference $F^{nc}$ ("Non-collaborative functionality") denotes a network apparatus that does not provide information about its internal state and that interacts with the Non-collaborative target functionality $F^{nc}_T$; the Non-collaborative functionality $F^{nc}$ may or may not have, but in any case it does not provide (for this reason it is qualified as "non-collaborative"), direct or indirect information useful to define the context of the Non-collaborative target functionality $F^{nc}_T$.

Through the interfaces between the network apparatuses, in addition to the parametrization allowed and accepted by each network apparatus (i.e., in addition to the set of control parameters that a certain network apparatus, e.g. the Non-collaborative target functionality $F^{nc}_T$, exposes and that can be modified exploiting one or more functionalities made available by that network apparatus), it is possible to make requests to gain knowledge about the network apparatus internal state (i.e., even if a network apparatus does not expose certain pieces of information, it is possible to infer some of them by exploiting the exposed control parameters); depending on the level of collaboration thereof, a network apparatus may or may not respond to the received requests (or the answer that the network apparatus provides may not contain useful information for the management system). The requests to a certain network apparatus, e.g. the Non-collaborative target functionality $F^{nc}_T$, can be made either directly or indirectly, passing through one or more intermediate network apparatuses.

Figure 2:
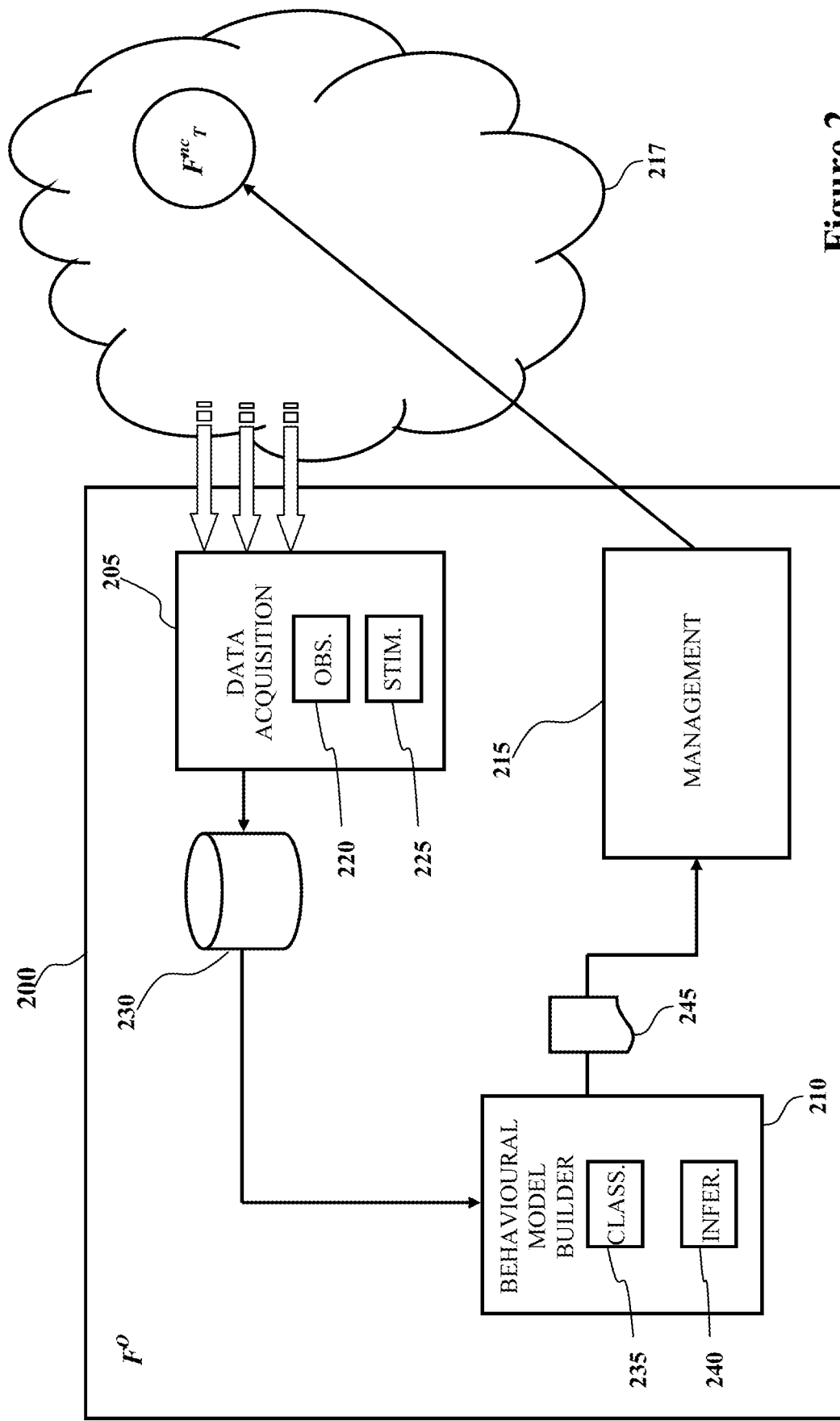
FIG. 2 depicts, in terms of functional blocks, a management system according to an embodiment of the solution disclosed herein.

FIG. 2 schematically shows, in terms of some functional blocks, the Observing functionality $F_O$ or management system 200 according to an exemplary embodiment of the solution disclosed herein.

The management system 200 essentially comprises a data acquisition function (data collector) 205, a behavioral model builder function 210 and a management function (manager) 215. The data acquisition function 205, the behavioral model builder function 210 and the management function 215 can be implemented in hardware, in software (by programming a general-purpose or dedicated data processor, possibly distributed, to execute a computer program) or partly in hardware and partly in software.

The data acquisition function 205 is devoted to collect information and data useful to allow the management system 200 to build a behavioral model of a target network apparatus to be managed, in the example the Non-collaborative target functionality $F^{nc}_T$. The data acquisition function 205 comprises an observation function 220 and a stimulation function 225: the observation function 220 is configured to collect data by simple, passive observation of the telecommunication network 217 (exploiting network probes, e.g. user equipment); the stimulation function 225 is configured to generate and inject into the network 217 stimuli for the target network apparatus to be managed, and the observation function 220 then acquires the consequent responses.

The data acquired by the data acquisition function 205 are stored, for example in a database 230 of the management system 200.

The behavioral model builder function 210 exploits the data acquired by the data acquisition function 205 and stored in the database 230 to build a behavioral model of the Non-collaborative target functionality $F^{nc}{}_T$. The behavioral model builder function 210 includes a data classifier function 235 and a behavioral model inference function 240.

In an embodiment of the solution disclosed herein, the behavioral model builder function 210 builds the behavioral model of the Non-collaborative target functionality $F^{nc}{}_T$ as follows.

The data classifier function 235 is configured to classify the data (taken from the database 230) in data classes.

The behavioral model inference function 240 is configured to take the data classified by the data classifier function 235 and infer and build a behavioral model 245 of the Non-collaborative target functionality $F^{nc}{}_T$.

The management function 215 is configured to exploit the behavioral model 245 for managing the Non-collaborative target functionality $F^{nc}{}_T$.

Figure 3:
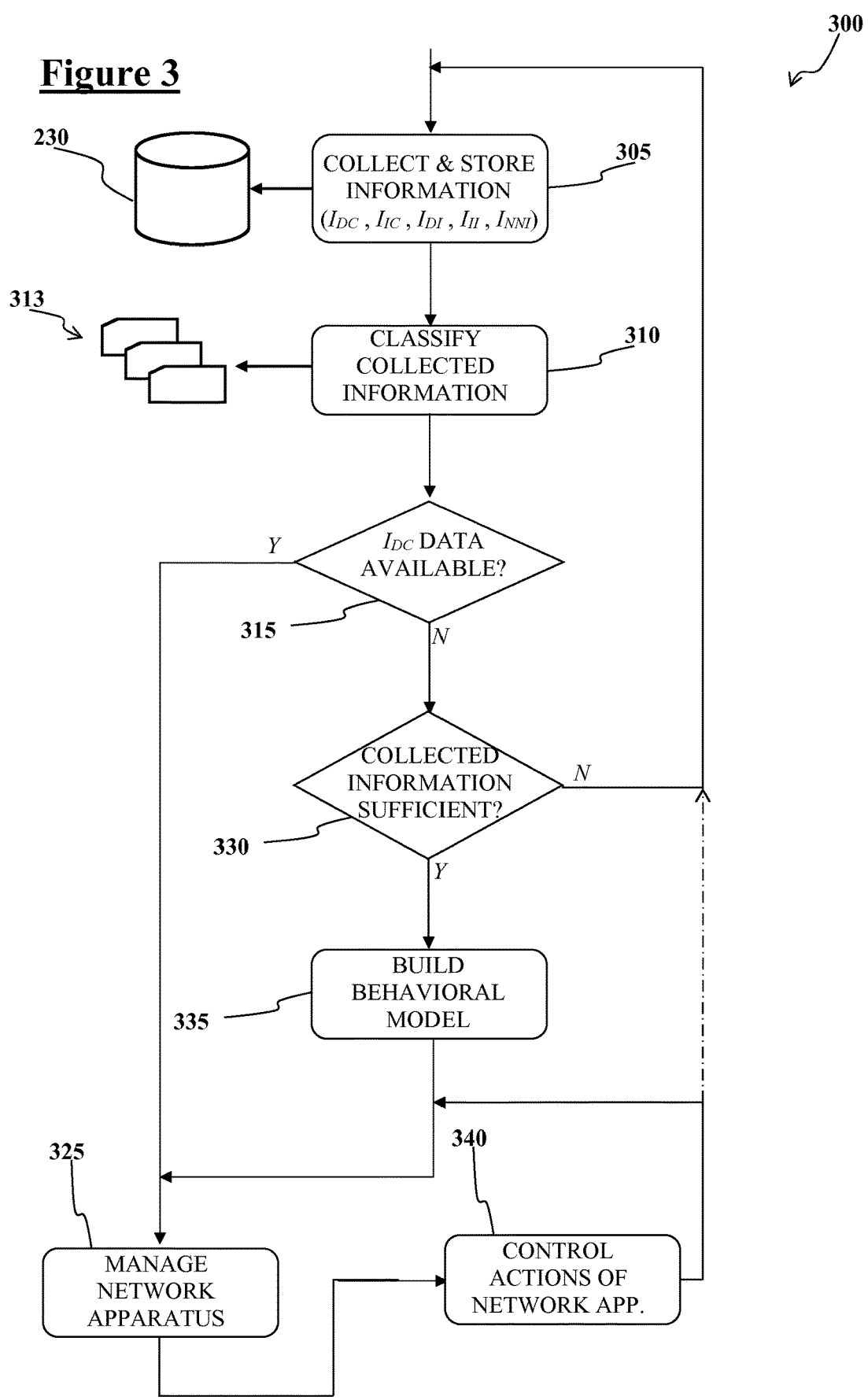
FIG. 3 is a flowchart of a method according to an embodiment of the solution disclosed herein.

In an embodiment of the solution herein disclosed, the management system 200 operates as described herebelow, making reference to the flowchart 300 of FIG. 3.

The data acquisition function 205 of the management system 200 collects and stores information, data about the target network apparatus to be managed (block 305). Particularly, the data acquisition function 205 is configured to acquire several kinds of data, either by simple, passive observation of the telecommunication network 217 (by the observation function 220), or possibly by injection into the network 217 of stimulations for the target network function to be managed (stimulation function 225) and then observing (by the observation function 220) the reactions to the injected stimuli.

The data acquired by the data acquisition function 205 can be:

a) Direct and complete data $I_{DC}$: a target network apparatus to be managed may provide, either upon simple observation or upon stimulation, the information necessary to the management system 200 for managing the target network apparatus to be managed; in this case, the target network apparatus to be managed cannot be qualified as a non-collaborative target functionality (like instead is, in the example considered herein, the Non-collaborative target functionality $F^{nc}{}_T$) and there is no need to build a behavioural model of it.

b) Indirect and complete data $I_{IC}$: the target network apparatus to be managed, in the example the Non-collaborative target functionality $F^{nc}{}_T$, may provide, by simple observation (observation function 220) or upon stimulation (by the stimulation function 225) and observation (observation function 220), information (useful to the management system 200 to build a behavioral model thereof) to a neighboring network apparatus being a Collaborative functionality $F^c$. The latter provides the information to the management system 200.

c) Direct and incomplete data $I_{Di}$: these are data that may be provided directly by the Non-collaborative target functionality $F^{nc}{}_T$ to the management system 200, through simple observation (observation function 220) or upon stimulation (by the stimulation function 225) and observation (observation function 220), but the data provided are not complete in their typology or do not provide an exhaustive response for the purpose of determining the behavioral model of the Non-collaborative target functionality $F^{nc}{}_T$. For example, in response to a request of telling which is the current load level, the Non-collaborative target functionality $F^{nc}{}_T$ may provide a value expressed as a percentage, which in itself does not indicate which are the residual load capabilities in absolute value, whereas when requested to provide information about how many more users the Non-collaborative target functionality $F^{nc}{}_T$ can still accept, the Non-collaborative target functionality $F^{nc}{}_T$ may not provide an answer.

d) Indirect and incomplete data $I_{Ii}$: these are data that the Non-collaborative target functionality $F^{nc}{}_T$ does not provide directly when requested, but that can be found, or inferred, deduced, by means of a request to a Collaborative functionality $F^c$ interacting with the Non-collaborative target functionality $F^{nc}{}_T$. For example, these data may be related to the number of hand-overs performed between the Non-collaborative target functionality $F^{nc}{}_T$ and the Collaborative functionality $F^c$ for user terminals having active connections: a response to a request of this piece of information coming from the management system 200 and received at all the network apparatuses in the neighborhood of the Non-collaborative target functionality $F^{nc}{}_T$ enables the management system 200 to build a model of the level of load of the Non-collaborative target functionality $F^{nc}{}_T$.

e) Initially unknown and incomplete data $I_{NNi}$: these are data that are not available to any one of the network apparatuses, and must therefore be collected by the management system 200, for example by:

e1) Passive observation (tracing), carried out by the observation function 220, of the behavior of the Non-collaborative target functionality $F^{nc}{}_T$: the observation function 220 of the management system 200 observes the actions performed by the Non-collaborative target functionality $F^{nc}{}_T$, for example exploiting probes located at the network interfaces that concern the Non-collaborative target functionality $F^{nc}{}_T$, to observe actions of admission control or hand-over.

e2) Active observation of the behavior of the Non-collaborative target functionality $F^{nc}{}_T$: by having the stimulation function 225 generate external stimuli (e.g., generating ad-hoc offered traffic for the Non-collaborative target functionality $F^{nc}{}_T$) the management system 200 causes changes of context and observes (through the probes located at the network interfaces) the consequent behavior of the Non-collaborative target functionality $F^{nc}{}_T$.

The collected data are stored in the database 230 (block 305).

The data classifier function 235 of the behavioral model builder function 210 is configured to classify the data (taken from the database 230) in data classes (block 310). For example, the collected data can be classified in the following three classes 313:

i) Context data: information about the context in which the Non-collaborative target functionality $F^{nc}{}_T$ operates. For example, in the case of a mobile telecommunications network, the context data may include: the geographical location of the Non-collaborative target functionality $F^{nc}{}_T$ (this information is for example useful to determine the degree of urbanization of the geographic area served by the Non-collaborative target functionality $F^{nc}{}_T$); the type of the neighboring network apparatuses in the neighborhood of the Non-collaborative target functionality $F^{nc}{}_T$; the frequency plan(s) of the neighboring network apparatuses;

ii) Internal state data: information about the internal state of the Non-collaborative target functionality $F^{nc}{}_T$, for example: the load level, the used resources, the available resources;

iii) Undertaken actions data: information about the actions that the Non-collaborative target functionality $F^{nc}{}_T$ undertakes, for example: acceptance or denial of new requests of resources (the resources requests can be stimulated by the normal operation of the Non-collaborative target functionality $F^{nc}{}_T$ or by the (stimulation function 225 of the) management system 200); occupation of new resources depending on the load level; directions of the hand-overs.

In particular, the data classifier function 235 classifies the collected data stored in the database 313 in three categories of variables:

Observable status variables Vs: these are pieces of information related to internal status of the target functionality (target node) and are for example: a load level of the target functionality; an active cell number of the target functionality. The observable status variables Vs can be directly observed or inferred by the Observing functionality $F_O$;

Controllable variables Vc: these are pieces of information related to parameters that it is possible to set in order to push the target functionality (target node) to execute a functionality, like for example: a load threshold; provided traffic load;

Behavior variables Vb: these are pieces of information related to functionalities that the target functionality (target node) can execute, as an example: an Inter-Frequency Hand-Over (e.g., to offload a network cell); a frequency switch off (to reduce power consumption).

Such a classification of the collected and stored data in the above three categories of variables Vs, Vc and Vb is useful to define inferred internal states (related to target functionality) and relations among them. As schematically shown in the state-transition diagram depicted in FIG. 4, the generic status Stat1, Stat2, StatN of the target functionality is defined by a corresponding set of observable variables Vs related to the target functionality. The generic behavior Behav A, Behav B, Behav C, Behav D, Behav E of the target functionality is defined by a corresponding set of behavior variables Vb. Each behavior of the target functionality is a function of the initial status Stat1, Stat2, StatN, of the final status Stat1, Stat2, StatN and of a corresponding set of controllable variables Vc.

The behavioral model builder function 210 then assesses whether the collected data relating to the target network apparatus to be managed include Direct and complete data $I_{DC}$: (decision block 315).

In the affirmative case (exit branch Y of decision block 315), the target network apparatus to be managed is considered to be collaborative and there is no need for the management system 200 to build a behavioral model thereof. The target network apparatus can be managed by the management system 200 exploiting the interfaces already exposed by the target network apparatus (block 325).

In the negative case (exit branch N of decision block 315), the target network apparatus is non-collaborative (as in the example here considered of the Non-collaborative target functionality $F^{nc}{}_T$) and cannot be managed exploiting the interfaces already exposed by the target network apparatus: a behavioral model of the target network function to be managed needs to be built by the management system 200.

The management system 200 assesses whether the collected data are sufficient to build a behavioral model of the Non-collaborative target functionality $F^{nc}{}_T$ (block 330).

In the negative case (exit branch N of decision block 330), the management system 200 needs to collect more information about the Non-collaborative target functionality $F^{nc}{}_T$: the operation flow returns to block 305.

In the affirmative case (exit branch Y of decision block 330), the behavioral model inference function 240 exploits the classified data 313 to infer and build (synthetize) a behavioral model 245 of the Non-collaborative target functionality $F^{nc}{}_T$ (block 335).

Depending on the level of completeness of collected data regarding the Non-collaborative target functionality $F^{nc}{}_T$, the behavioral model 245 can be limited to model the behavior of the Non-collaborative target functionality $F^{nc}{}_T$ as far as one or some configuration parameters of interest are concerned (i.e., the behavioral model 245 needs not to be a complete, full behavioral model of the Non-collaborative target functionality $F^{nc}{}_T$).

Figure 4:
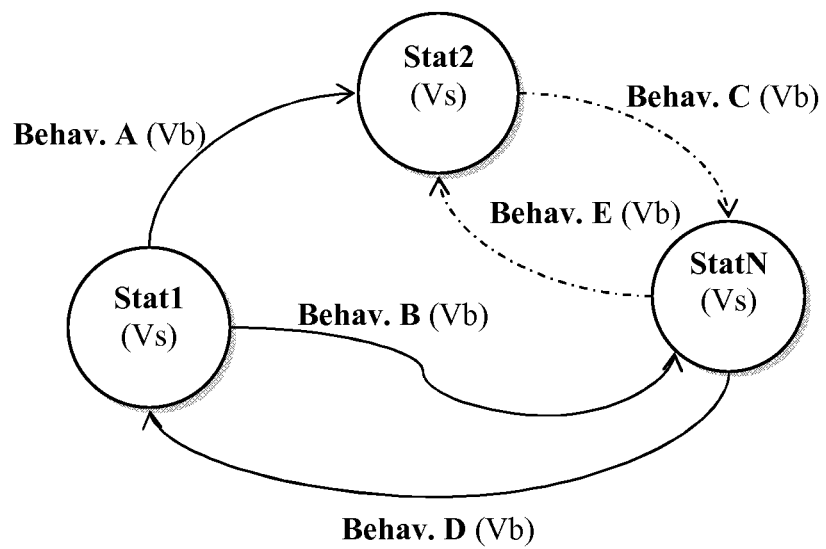
FIG. 4 schematizes an exemplary behavioural model of the target network apparatus to be managed inferred according to an embodiment of the solution disclosed herein.

In particular, the behavioral model inference function 240 correlates the collected and stored data, arranged in the three categories of observable status variables Vs, controllable variables Vc and behavior variables Vb in order to build a state-transition diagram (inferred state-transition diagram, like that depicted in FIG. 4) which represents the behavioral model of the target functionality. Such inferred state-transition diagram can be used to:

define a current internal status of the target functionality (for example Stat1 in FIG. 4);

determine which possible behaviors the target functionality will be able to execute (for example the behaviors Behav. A and Behav. B);

determine which is the most suitable status for the target functionality to reach (in the example of FIG. 4 there are three possibilities: status Stat1, status Stat2 or status StatN). This allows the selection of the behavior that the target functionality should execute;

define the controllable variables Vc in order to push the target functionality to execute the selected behavior.

Once the behavioral model 245 has been generated, the management function 215 exploits the behavioral model 245 for managing the Non-collaborative target functionality $F^{nc}{}_T$ (block 325).

In particular, in an embodiment of the solution disclosed herein the management function 215 is configured to operate as follows.

Firstly, the management function 215 identifies how to manage the Non-collaborative target functionality $F^{nc}{}_T$. Three ways of managing the Non-collaborative target functionality $F^{nc}{}_T$ are possible:

by direct action: the configuration parameter values regarding the Non-collaborative target functionality $F^{nc}{}_T$ defined exploiting the behavioral model 245 are directly sent to the Non-collaborative target functionality $F^{nc}{}_T$ (through one of the exposed interfaces thereof);

by indirect action: the configuration parameter values regarding the Non-collaborative target functionality $F^{nc}{}_T$ defined exploiting the behavioral model 245 are indirectly sent to the Non-collaborative target functionality $F^{nc}{}_T$ through neighbouring network apparatuses being collaborative functionalities, like the Collaborative functionality $F^c$;

by induced action: the behaviour of the Non-collaborative target functionality $F^{nc}{}_T$ is inferred through changes of the behaviour of neighbouring network apparatuses being collaborative functionalities (like the Collaborative functionality $F^c$).

Then, the management function 215 derives suitable values for the configuration parameters regarding the Non-collaborative target functionality $F^{nc}{}_T$.

Figure 5:
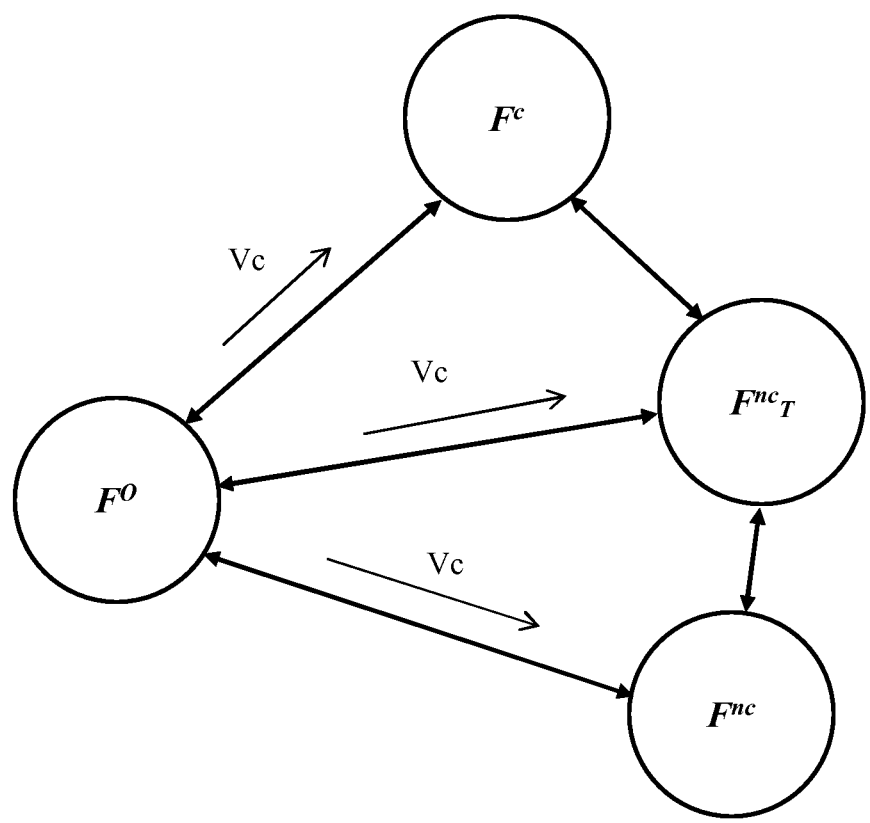
FIG. 5 schematizes actions performed by the management system to manage the target network apparatus to be managed based on the inferred behavioural model of FIG. 4.

In particular, making reference to the schematic state-transition diagram of FIG. 5, the behavioral model is used by the management function 215 to control the behavior of the Non-collaborative target functionality $F^{nc}{}_T$ by using the controlling variables Vc in order to set its internal status (such an internal status being one of the inferred internal statuses making up the behavioral model).

The management function 215 then ascertains and controls the actions undertaken by the Non-collaborative target functionality $F^{nc}{}_T$ (block 340) and, if necessary, the behavioral model 245 can be corrected, or a new behavioral model can be built (dash-and-dot arrow in FIG. 3).

The data acquisition function 205 can collect the information useful to build the behavioral model once, periodically or continuously as time goes by ("streaming mode").

The phase of generation of the behavioral model of the Non-collaborative target functionality $F^{nc}{}_T$ is a continuous process, which involves collecting new information from the observed functions and introduce some modifications to an already generated behavioral model if it is needed.

Use Cases

Use Case 1

In the following, an exemplary use case of the solution disclosed herein is described.

The scenario of the exemplary use case considers as a Non-collaborative target functionality $F^{nc}{}_T$ a network node $N^{nc}{}_T$ of an access network (e.g., a Radio Access Network—RAN—of a mobile telecommunication network, such as an eNodeB of an LTE/LTE-A cellular network). It is assumed that the target network node $N^{nc}{}_T$ is receiving several service requests. Such service requests are approaching a level at which, in the past, an observing network node $N_O$ (being the Observing functionality $F_O$ of FIG. 1, i.e. the management system 200 having the function of managing the mobile telecommunication network) has observed that the network node $N^{nc}{}_T$ has activated an additional radio carrier (and it is assumed that the network operator of the mobile telecommunication network wishes to avoid, as far as possible, this kind of reactions in an energy-saving perspective). The observing network node $N_O$, not being able to modify the internal load threshold of the target network node $N^{nc}{}_T$ (because the latter is non-collaborative), decides to reconfigure the network subsystem to which the target network node $N^{nc}{}_T$ belongs and in which it operates, causing part of the network traffic to be transferred to a neighboring network node in the neighborhood of the target network node $N^{nc}{}_T$.

In greater detail, let it be assumed that the target network node $N^{nc}{}_T$ has two carriers available, only one of which (first carrier) is active until the metric that measures the resources occupation of the first carrier does not trespass a certain threshold, e.g. 80% of the first carrier resources. When the resources occupation threshold is trespassed, the second carrier of the target network node $N^{nc}{}_T$ is activated, and part of the network node incoming traffic starts being moved to the second carrier. Let it also be assumed that another non-collaborative network node $N^{nc}$ which does not collaborate with the observing network node $N_O$ operates in the same geographical area as the target network node $N^{nc}{}_T$ and a collaborative network node $N^c$ operates in a boundary geographical area and is capable of serving network traffic.

Data Acquisition Phase

Step 1: the observing network node $N_O$ collects configuration data about the target network node $N^{nc}{}_T$.

In particular, the observing network node $N_O$ requests to the target network node $N^{nc}{}_T$ how many carriers it has available: no response is received from the target network node $N^{nc}{}_T$ (being non-collaborative). Then, the observing network node $N_O$ requests to the target network node $N^{nc}{}_T$ the level of occupation of resources which, when reached, causes the activation of the second carrier (the above-mentioned load threshold): again, no response is received from the target network node $N^{nc}{}_T$. It is pointed out that "no response is received" is to be intended as encompassing several possible situations: for example, the parameter that the observing network node $N_O$ would need to know is not included in the parameters that the proprietary management interface exposed by the target network node $N^{nc}{}_T$ can provide; or, the response that is provided to the observing network node $N_O$ by the target network node $N^{nc}{}_T$ cannot be directly used by the observing network node $N_O$ because it is expressed in a semantic that is not known to the observing network node $N_O$; or, the response provided by the target network node $N^{nc}{}_T$ does not contain a significant value (e.g., "nil").

Step 2: the observing network node $N_O$ collects information about the state, the behavior and the operating environment of the target network node $N^{nc}{}_T$:

the observing network node $N_O$ asks to the target network node $N^{nc}{}_T$ which is the occupation of resources thereof: the target network node $N^{nc}{}_T$ responds with a value expressed as a percentage, which is a relative value and does not indicate the actual amount of resources still available at the target network node $N^{nc}{}_T$;

then, the observing network node $N_O$ asks to the other non-collaborative network node $N^{nc}$ how many requests of Inter-Frequency Hand-Over (IF HO) in a given time interval the non-collaborative network node $N^{nc}$ has received from the target network node $N^{nc}{}_T$: no response is provided by the non-collaborative network node $N^{nc}$;

then, the observing network node $N_O$ asks to the collaborative network node $N^c$ how many requests of IF HO the collaborative network node $N^c$ has received from the target network node $N^{nc}{}_T$: the collaborative network node $N^c$ responds by providing a number, which has a meaning and is useful for the observing network node $N_O$;

then, the observing network node $N_O$ asks to the collaborative network node $N_c$ to report the measures performed by the user equipment served by the collaborative network node $N^c$;

then, the observing network node $N_O$ requests to probes (e.g., user terminals) present in the mobile telecommunication network to provide information about the carriers related to the target network node $F^{nc}{}_T$.

Preferably, the observing network node $N_O$ performs this step (step 2) repeatedly, even more preferably periodically, in order to be able to track the evolution of the mobile telecommunication network (or at least of the managed network subsystem made up by the target network node $N^{nc}{}_T$, the non-collaborative network node $N^{nc}$ and the collaborative network node $N^c$) and to regularly update the behavioral model of the target network node $N^{nc}{}_T$.

Behavioral Model Generation

The observing network node $N_O$ builds a data structure with the data collected in the previous phase. For example, the data structure can take the form of a table in which the collected data are arranged as in the exemplary table below:

| status | Observable status variables Vs | Behavior variables Vb | Controlled variables Vc |
| --- | --- | --- | --- |
| Status 1 | Vs1: Percentage of resource occupation of $N^{nc}_T$ = medium<br>Vs2: Number of carriers activated by $N^{nc}_T$ = 1<br>Vs3: Number of IF HO requests from $N^c$ = low | Vb1: Number of activated carriers = 1 | Vc1: IF HO threshold in order to modify the number of users accessing $N^{nc}_T$ = high |
| Status 2 | Vs1: Percentage of resource occupation of $N^{nc}_T$ = high<br>Vs2: Number of carriers activated by $N^{nc}_T$ = 2<br>Vs3: Number of IF HO requests from $N^c$ = high | Vb1: Number of activated carriers = 2 | Vc1: IF HO threshold in order to modify the number of users accessing $N^{nc}_T$ = low |

The internal statuses of the target network node $N^{nc}_T$ which are relevant for the considered use case (and which the observing network node $N_O$ has to infer) are two, and are denoted as Status 1 and Status 2 in the table. The table contains two rows, one row for each internal status of the target network node $N^{nc}_T$ inferred by observing network node $N_O$.

For each row, i.e. for each inferred internal status Status 1 and Status 2, corresponding values of the relevant observable status variables Vs, behavior variables Vb and controllable variables Vc are reported in columns of the table.

In particular, the observable status variables Vs include: the percentage (medium or high) of resource occupation of the target network node $N^{nc}_T$ (variable Vs1); the number of carriers (1 or 2) activated by the target network node $N^{nc}_T$ (variable Vs2); and the number (low or high) of requests Inter-Frequency Hand-Overs (IF HO) received from the collaborative network node $N^c$ (variable Vs3). The behavior variables Vb include the number (1 or 2) of activated carriers (variable Vb1). The controllable variables Vc include the threshold (low or high) of IF HOs to be set in order to modify the number of users accessing the target network node $N^{nc}_T$ (variable Vc1).

Figure 6:
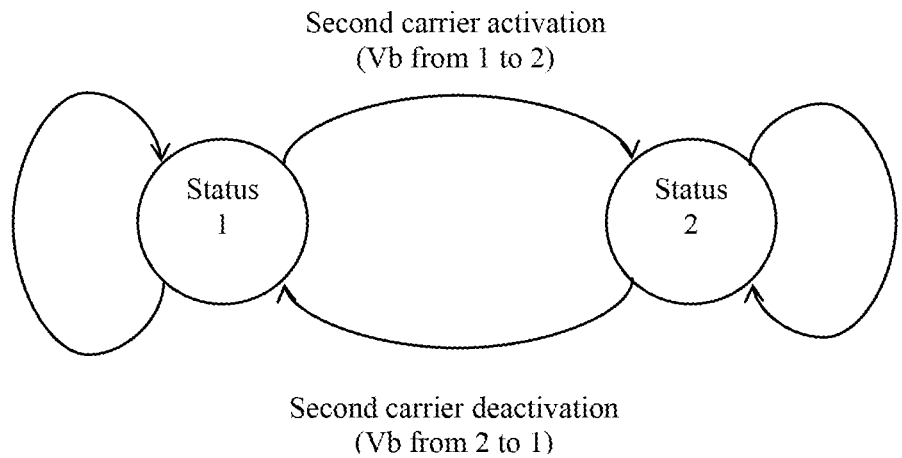
FIG. 6 schematizes another exemplary behavioural model of the target network apparatus to be managed inferred according to an embodiment of the solution disclosed herein.

The behavioral model created by the observing network node $N_O$ is schematized by the state-transition diagram shown in FIG. 6.

Management

The behavioral model is then used by the observing network node $N_O$ to optimize the managed network subsystem (made up by the target network node $N^{nc}_T$, the non-collaborative network node $N^{nc}$ and the collaborative network node $N^c$).

In case the target network node $N^{nc}_T$ is in the status 1 the observing network node $N_O$ does not modify the network configuration, otherwise the observing network node $N_O$ will modify the value of the controllable variable Vc (IF HO threshold) setting it at a low level value: in this way the number of users executing IF HO procedure will increase and the load level of the target network node $N^{nc}_T$ will decrease, causing the turn off of the second carrier.

In other words, when the observing network node $N_O$ perceives that the level of load of the target network node $N^{nc}_T$ approaches the threshold percentage $P_s$ (say, the threshold percentage $P_s$ less a security margin), then the observing network node $N_O$ may react and do the following.

The observing network node $N_O$ asks to the collaborative network node $N^c$ which is its percentage of occupation of resources; if the percentage of occupation of resources of the collaborative network node $N^c$ is below a predetermined threshold, then the observing network node $N_O$ lowers the threshold of the HO of the collaborative network node $N^c$ towards the target network node $N^{nc}_T$, in order to transfer the users served by the target network node $N^{nc}_T$ and located at the borders of the served area (cell) thereof towards the collaborative network node $N^c$. If the collaborative network node $N^c$ becomes in turn overloaded, then the observing network node $N_O$ may act on the threshold of the HO of the collaborative network node $N^c$ towards the non-collaborative network node $N^{nc}$.

The operations that the observing network node $N_O$ performs in respect of the target network node $N^{nc}_T$ are performed on all the neighboring nodes in the neighborhood thereof (the collaborative network node $N^c$ and non-collaborative network node $N^{nc}$), thereby the observing network node $N_O$ can build a complex data structure regarding both the state and the behaviors of every network node of the managed network subsystem, and the state relationships and the behaviors between the network nodes. This knowledge becomes the basis for performing configurations and optimizations that do not affect independently the network nodes of the managed subsystem, but on the contrary are correlated actions.

Use Case 2

Reference is made to a scenario similar to that described in connection with Use case 1. In the case now considered the target (non-collaborative) network node $N^{nc}_T$ is assumed to be able to communicate some of its internal performance parameters, but the resource optimization algorithm implemented by the target network node $N^{nc}_T$ is unknown to the observing network node $N_O$. In the considered scenario there are some (at least one) collaborative network nodes $N^c$ in the neighborhood of the target network node $N^{nc}_T$: these collaborative network nodes $N^c$ are able to communicate their internal status (in particular, their internal load level) and some kind of interactions between them and the target network node $N^{nc}_T$ (e.g., HO events).

The goal of the observing network node $N_O$ is to control the target network node $N^{nc}_T$ and its neighbor network nodes in order to optimize the provided level of Quality of Service (QoS level).

Behavioral Model Generation

The behavioral model builder function 210 collects the configuration parameters of the collaborative network nodes $N^c$ and their internal status (load levels and provided QoS level). After that, the behavioral model builder function 210 sets the levels of IF HO in the collaborative network nodes $N^c$ toward target network node $N^{nc}_T$ in order to increase the level of load of the target network node $N^{nc}_T$, and collects significant data regarding how the Radio Resource Management (RRM) algorithm of the target network node $N^{nc}_T$ works (for example: the types of HOs executed, varying HO thresholds and QoS level).

A mapping table is created, linking the internal load level (e.g., in terms of number of users) of the target network node $N^{nc}_T$ and of its neighbor nodes to the related action (inter-node HO events and provided QoS level).

Figure 7:
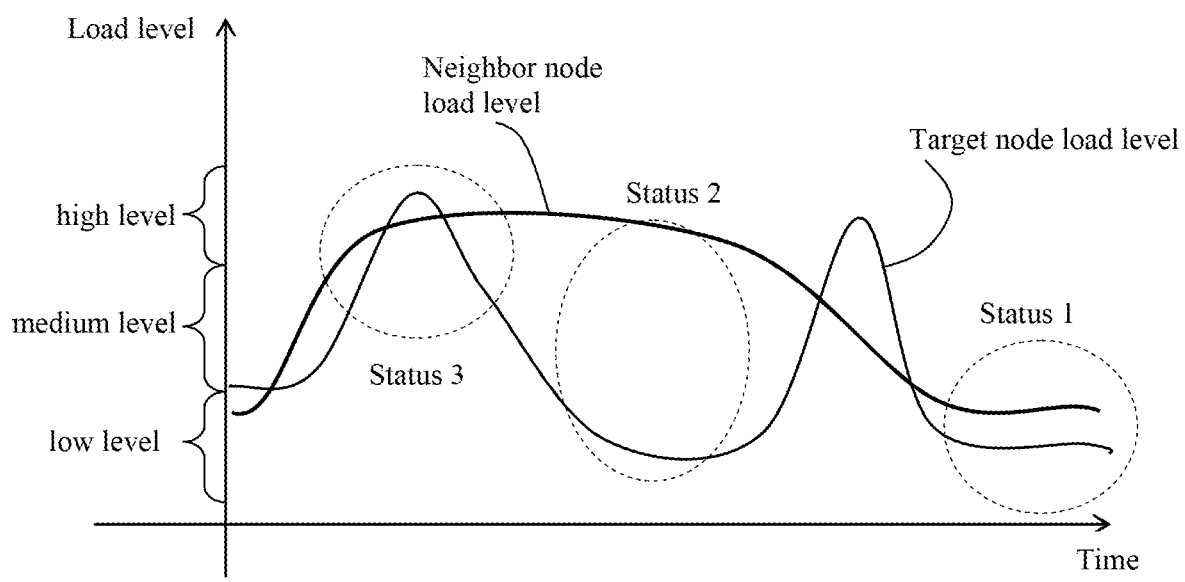
FIG. 7 depicts an exemplary relationship between internal statuses of the target network apparatus to be managed and data obtained by the management system from the target network apparatus to be managed and from neighbour network apparatuses, and FIG. 8 schematizes another exemplary behavioural model of the target network apparatus to be managed inferred according to an embodiment of the solution disclosed herein.

Each internal status will be characterized by certain values for the observable status variable "level of load" (in this case the behavior of the target network node $N^{nc}_T$ will depend on its internal status and on the status of the neighbor nodes), as shown in FIG. 7, where the level of load for the target network node derived by information from its neighbored collaborative nodes is depicted.

The observing network node $N_O$ builds a data structure with the data collected in the previous phase. For example, the data structure can take the form of a table in which the collected data are arranged as in the exemplary table below:

| Status | Status variables Vs | Behavior variables Vb | Controllable status variables Vc |
|---|---|---|---|
| Status 1 | Vs1: $N^{nc}_T$ load level = low | Vb1: number of HO events toward neighbor nodes = low | Vc1: $N^{nc}_T$ outcoming HO threshold = high |
| | Vs2: neighbor node load level = low | Vb2: number of HO events from neighbor nodes = low | Vc2: neighbor HO threshold = high |
| | | Vb3: level of QoS per user = high | Vc3: service priority = untouched |
| Status 2 | Vs1: $N^{nc}_T$ load level = low | Vb1: number of HO events toward neighbor nodes = low | Vc1: $N^{nc}_T$ outcoming HO threshold = low |
| | Vs2: neighbor node load level = high | Vb2: number of HO events from neighbor nodes = high | Vc2: neighbor HO threshold = medium |
| | | Vb3: level of QoS per user = medium/low | Vc3: service priority = modified |
| Status 3 | Vs1: $N^{nc}_T$ load level = high | Vb1: number of HO events toward neighbor nodes = high | Vc1: $N^{nc}_T$ outcoming HO threshold = high |
| | Vs2: neighbor node load level = high | Vb2: number of HO events from neighbor nodes = high | Vc2: neighbor HO threshold = high |
| | | Vb3: level of QoS per user = low | Vc3: service priority = modified |

The internal statuses of the target network node $N^{nc}_T$ which are relevant for the considered use case (and which the observing network node $N_O$ has to infer) are three, and are denoted as Status 1, Status 2 and Status 3 in the table. The table contains three rows, one row for each internal status of the target network node $N^{nc}_T$ inferred by observing network node $N_O$.

For each row, i.e. for each inferred internal status Status 1, Status 2 and Status 3, corresponding values of the relevant observable status variables Vs, behavior variables Vb and controllable variables Vc are reported in columns of the table.

In particular, the observable status variables Vs include: the load level of the target network node $N^{nc}_T$ (variable Vs1); and the load level of the neighbor network nodes (variable Vs2). The behavior variables Vb include: the number of HO events toward neighbor network nodes (variable Vb1); the number of HO events from neighbor network nodes (variable Vb2); and the level of QoS per user (variable Vb3). The controllable variables Vc include the threshold of HOs outcoming from the target network node $N^{nc}_T$ (variable Vc1); the threshold of HOs of the neighbor network nodes (variable Vc2); and the service priority (variable Vc3).

Figure 8:
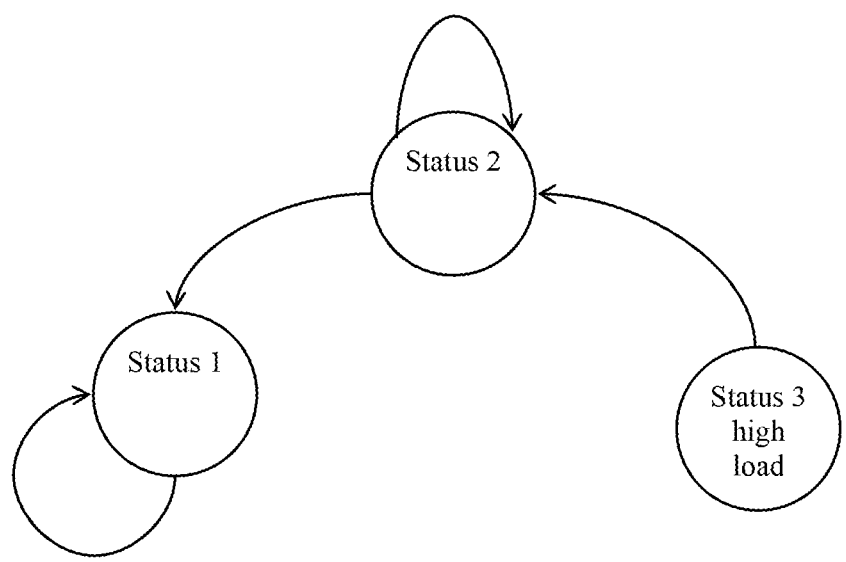

The behavioral model created by the observing network node $N_O$ is schematized by the state-transition diagram shown in FIG. 8.

Management

Based on the above described behavioral model, when the target node is in Status 3 (high level of load) and the observing network node $N_O$ wants to avoid the generation of an increased number of HOs towards the neighbor nodes (variable Vb1), the observing network node $N_O$ can reduce the service priority associated to some user equipment (variable Vc3) so that the throughput can be reduced.

The invention claimed is:

1. A method of managing a network apparatus of a telecommunication network, the method comprising:
   collecting, by a management system, data about the network apparatus to be managed by making requests to the network apparatus to be managed and to at least one other network apparatus in operating relationships with the network apparatus to be managed;
   based on the collected data, generating, by the management system, a behavioral model of the network apparatus to be managed, the behavioral model being an inferred logical and mathematical model of the behavior of the network apparatus to be managed with respect to at least one operational parameter thereof of interest for the managing, and
   managing, by the management system, the network apparatus to be managed exploiting the generated behavioral model thereof,
   wherein the network apparatus to be managed does not expose management interfaces to the management system that are sufficient to allow the management system to manage the at least one operational parameter of the network apparatus to be managed,
   wherein said generating the behavioral model of the network apparatus to be managed comprises classifying the collected data in data classes, said data classes comprising:
      a first class of data indicative of the context in which the network apparatus to be managed operates;
      a second class of data indicative of the internal state of the network apparatus to be managed; and
      a third class of data indicative of actions performed by the network apparatus to be managed.

2. The method of claim 1, wherein said collecting information comprises generating stimuli for the network apparatus to be managed and collecting data indicative of the observed reactions thereof to the generated stimuli.

3. The method of claim 2, wherein said collecting data indicative of the observed reactions comprises collecting data from user equipment of the telecommunication network.

4. The method of claim 1, wherein said at least one other network apparatus includes at least one network apparatus that exposes management interfaces configured to provide, upon interrogation, data relating to its own internal state and that, being in operating relationship with the network functionality to be managed, has got and can provide data useful to define an operating context of the network functionality to be managed.

5. The method of claim 4, wherein the collected data comprise one or more among:

data, obtained from said at least one other network apparatus and sufficient to generate the behavioral model of the target network apparatus to be managed, that the network apparatus to be managed provides to said at least one other network apparatus;

data, obtained directly from the network apparatus to be managed, that are not sufficient to generate the behavioral model thereof; and data, obtained from said at least one other network apparatus, that are not sufficient to generate the behavioral model thereof.

6. The method of claim 1, wherein said first class of data includes one among: a geographical location of the network apparatus to be managed, an indication of the type of the neighboring network apparatuses in the neighborhood of the network apparatus to be managed, and an indication of frequency plan(s) of the neighboring network apparatuses.

7. The method of claim 1, wherein said second class of data includes one among: an indication of the load level of the network apparatus to be managed, an indication of the resources used by the network apparatus to be managed, and an indication of the available resources of the network apparatus to be managed.

8. The method of claim 1, wherein said third class of data includes one among: an indication of acceptance or denial of new requests of resources; an indication of occupation of new resources depending on the load level; and an indication of directions of hand-overs.

9. The method of claim 1, wherein said generating the behavioral model of the network apparatus to be managed comprises classifying the collected data in categories of variables, said categories of variables comprising:

observable status variables, including data related to the internal status of the network apparatus to be managed that can be directly observed or inferred;

controllable variables, including data related to parameters that can be set in order to push the network apparatus to be managed to execute a function; and behavior variables, including data related to functionalities that the network apparatus to be managed can execute.

10. The method of claim 1, wherein said behavioral model of the network apparatus to be managed comprises a finite-state machine representative of the network apparatus to be managed.

11. The method of claim 1, wherein the network apparatus to be managed does not provide information related to a load level thereof.

12. A system for managing a network apparatus of a telecommunication network, the system comprising:

a data collector configured to collect data about the network apparatus to be managed by making requests to the network apparatus to be managed and to at least one other network apparatus in operating relationships with the network apparatus to be managed;

a behavioral model builder to generate, based on the collected data, a behavioral model of the network apparatus to be managed, the behavioral model being an inferred logical and mathematical model of the behavior of the network apparatus to be managed with respect to at least one operational parameter thereof of interest for the managing, and a manager configured for managing the network apparatus to be managed exploiting the generated behavioral model thereof, wherein the network apparatus to be managed does not expose management interfaces to the system that are sufficient to allow the system to manage the at least one operational parameter of the network apparatus to be managed, and in generating the behavioral model of the network apparatus to be managed, the behavioral model builder classifies the collected data in data classes, said data classes comprising:

a first class of data indicative of the context in which the network apparatus to be managed operates;

a second class of data indicative of the internal state of the network apparatus to be managed; and a third class of data indicative of actions performed by the network apparatus to be managed.

* * * * *